(12) United States Patent
Tada et al.

(10) Patent No.: US 7,219,489 B2
(45) Date of Patent: May 22, 2007

(54) GRASS COLLECTOR AND GRASS MOWER HAVING THE GRASS COLLECTOR

(75) Inventors: Hiroyuki Tada, Sakai (JP); Nobuyuki Yamashita, Izumi (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 11/069,899

(22) Filed: Mar. 1, 2005

(65) Prior Publication Data

US 2005/0284120 A1 Dec. 29, 2005

(30) Foreign Application Priority Data

Jun. 25, 2004 (JP) ............................. 2004-188313

(51) Int. Cl.
*A01D 43/00* (2006.01)
*A01D 43/06* (2006.01)

(52) U.S. Cl. ...................................... 56/202

(58) Field of Classification Search .................. 56/202, 56/16.6, 320.2

See application file for complete search history.

(56) References Cited

U.S. PATENT DOCUMENTS

| | | | |
|---|---|---|---|
| 3,949,540 A * | 4/1976 | Christopherson et al. ...... | 56/202 |
| 3,962,852 A | 6/1976 | Boyer | |
| 4,015,406 A | 4/1977 | Witt et al. | |
| 4,031,694 A * | 6/1977 | Gobin .......................... | 56/202 |
| 4,214,424 A * | 7/1980 | Gobin .......................... | 56/202 |
| 4,238,918 A | 12/1980 | Saruhashi et al. | |
| 4,306,408 A | 12/1981 | Christopherson et al. | |
| 4,393,645 A | 7/1983 | Moore | |
| 4,476,668 A | 10/1984 | Reilly | |
| 4,702,063 A | 10/1987 | Satoh et al. | |
| 4,800,712 A * | 1/1989 | Morse et al. .................. | 56/202 |
| 5,080,442 A * | 1/1992 | Doering et al. ................ | 298/6 |
| 5,195,310 A | 3/1993 | Kettler et al. | |
| 5,778,648 A * | 7/1998 | Parkes et al. .................. | 56/202 |
| 2004/0112027 A1 * | 6/2004 | Komorida et al. ............. | 56/202 |

FOREIGN PATENT DOCUMENTS

JP 2002-262635 9/2002

* cited by examiner

*Primary Examiner*—Árpád Fábián Kovács
(74) *Attorney, Agent, or Firm*—The Webb Law Firm (57) ABSTRACT

A grass collector for a grass mower adapted to move grass cuttings from a mower unit through a duct into a grass container disposed at a rear portion of a vehicle body, comprises: a support frame configured to be attached to the rear portion of the vehicle body of the grass mower; a connecting portion supported by the support frame; an engaging member provided to the grass container and engageable with the connecting portion wherein the grass container is detachably attached to the support frame by the engagement of the engaging member with the connecting portion; an engagement lock member provided in the grass container for preventing disengagement of the engaging member from the connecting portion; and an engagement releasing tool for releasing the engagement lock member, the releasing tool being disposed adjacent a handle provided on a top face of the grass container so that the releasing tool may be gripped simultaneously with the handle.

16 Claims, 13 Drawing Sheets

GRASS COLLECTOR AND GRASS MOWER HAVING THE GRASS COLLECTOR

BACKGROUND OF THE INVENTION

The present invention relates to a grass collector for use with a grass mower adapted to move grass cuttings from a mower through a duct into a grass container disposed at a rear portion of a vehicle body. The invention relates also to a grass mower having this grass collector.

A grass collector for a grass mower is known from e.g. U.S. Pat. No. 4,015,406. In this, a duct extending from a mower is connected to a support frame attached to a rear portion of a vehicle body, and a grass container having an open front face is supported to the support frame to be vertically pivotable by a manual operation so that the grass container can be pivotally switched over between a grass discharging posture where the front face of the container is away from the support frame and downwardly open and a grass collecting posture where the front face of the container is connected to the support frame to be communicated with the duct. In this document, when a control lever vertically slidably mounted on the top surface of the grass container is slid downward, a lower end of this control lever comes into engagement with a lock element provided on the support frame, thereby to lock the grass container to the grass collecting posture. When the control lever is pulled up, the lower end of the lever is removed from the locking portion, thereby to allow a pivotal movement of the grass container. Then, by pivoting the control lever under this lock released condition, the grass container can be pivoted to the grass discharging posture.

A further construction is known from U.S. Pat. No. 4,476,668. In this case, when a hook-like lock member provided in a grass container is urgedly engaged with an engaging member provided in a support frame, the glass container is fixedly connected or locked under its grass collecting posture. When a control lever provided to an upper portion of the grass container is operated upward, the lock member is removed from the lock member to allow a pivotal movement of the grass container. Under this lock released condition, the grass container can be pivoted to a grass discharging posture.

The grass collector needs to be detached occasionally from the support frame for cleaning or storage of the grass container. In this regard, with the above-described conventional grass collectors, for such detachment of the grass container, it is necessary to disassemble the pivot portion of the container relative to the support frame. Hence, the detaching operation of the grass container is difficult.

SUMMARY OF THE INVENTION

The present invention was made to address the above-described problem. A primary object of the invention is to provide a grass collector which allows easy attachment/detachment of the grass container.

To accomplish the above-noted object, a grass collector according to the present invention, for a mower which is adapted to move grass cuttings from a mower unit through a duct into a grass container disposed at a rear portion of a vehicle body, comprises: a support frame configured to be attached to the rear portion of the vehicle body of the grass mower; a connecting portion supported by the support frame; an engaging member provided to the grass container and engageable with the connecting portion wherein the grass container is detachably mounted to the support frame by the engagement of the engaging member with the connecting portion; an engagement lock member provided in the grass container for preventing disengagement of the engaging member from the connecting portion; and an engagement releasing tool for releasing the engagement lock member, the releasing tool being disposed adjacent a handle member provided on a top face of the grass container so that the releasing tool may be gripped simultaneously with the handle.

With the above-described arrangement, for detaching the grass container, an operator grips the handle provided on the top face of the grass container and the releasing tool simultaneously to release the engagement lock member so as to allow the engaging member to be disengaged from the connecting portion of the support frame. Then the operator moves the grass container so as to disengage its engaging member from the connecting portion of the support frame, whereby the grass container can be detached from the support frame. Thus the invention has provided a grass collector which allows easy attachment/detachment of the grass container.

Further and other objects, features and advantages of the present invention will become apparent for those skilled in the art upon reading the following detailed description of preferred embodiments thereof with reference to the accompanying drawings.

DETAILED DESCRIPTION OF THE PREFERRED EMBODIMENTS

Preferred embodiments of the present invention will be described in details with reference to the accompanying drawings.

Figure 1:
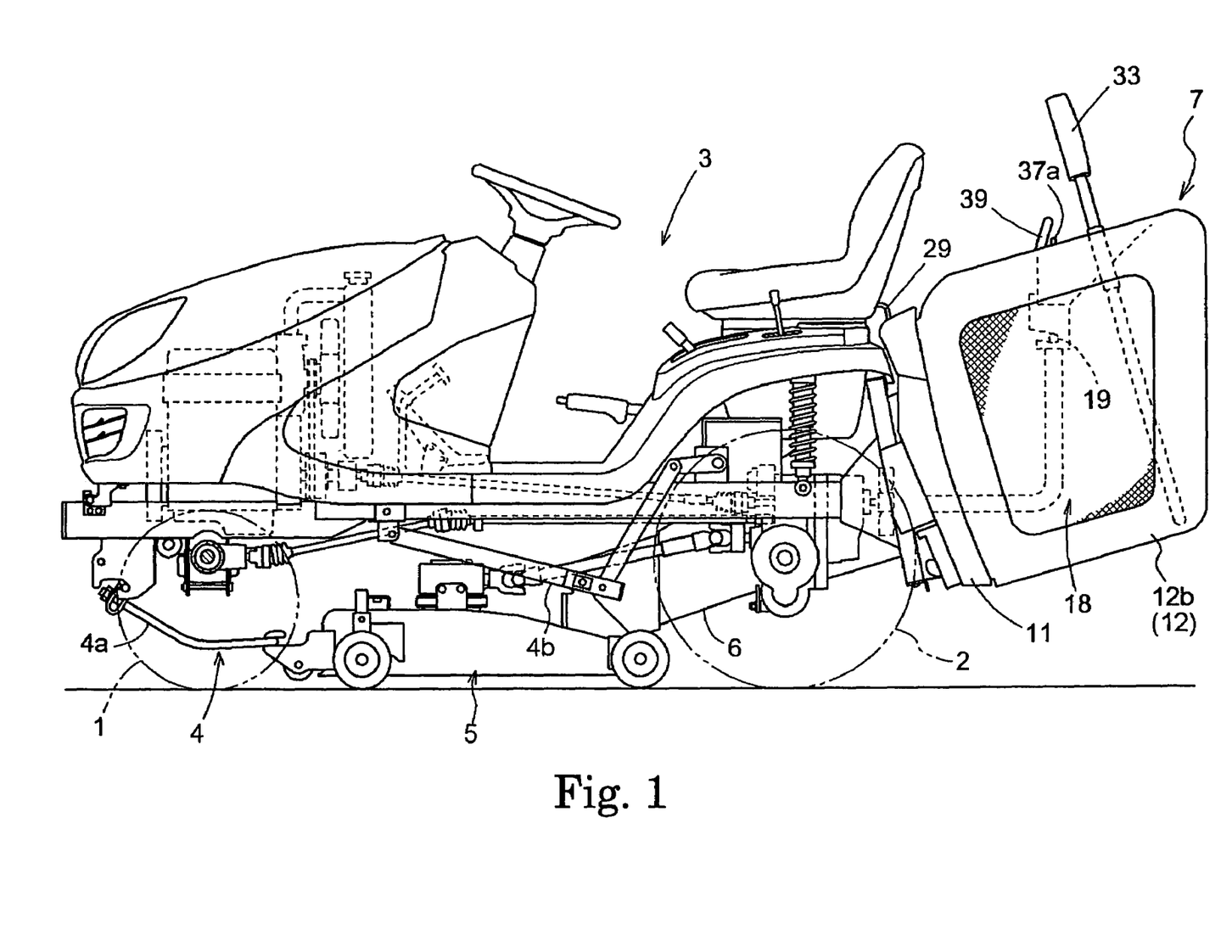
FIG. 1 is an overall side view of a grass mower relating to the present invention.
Figure 2:
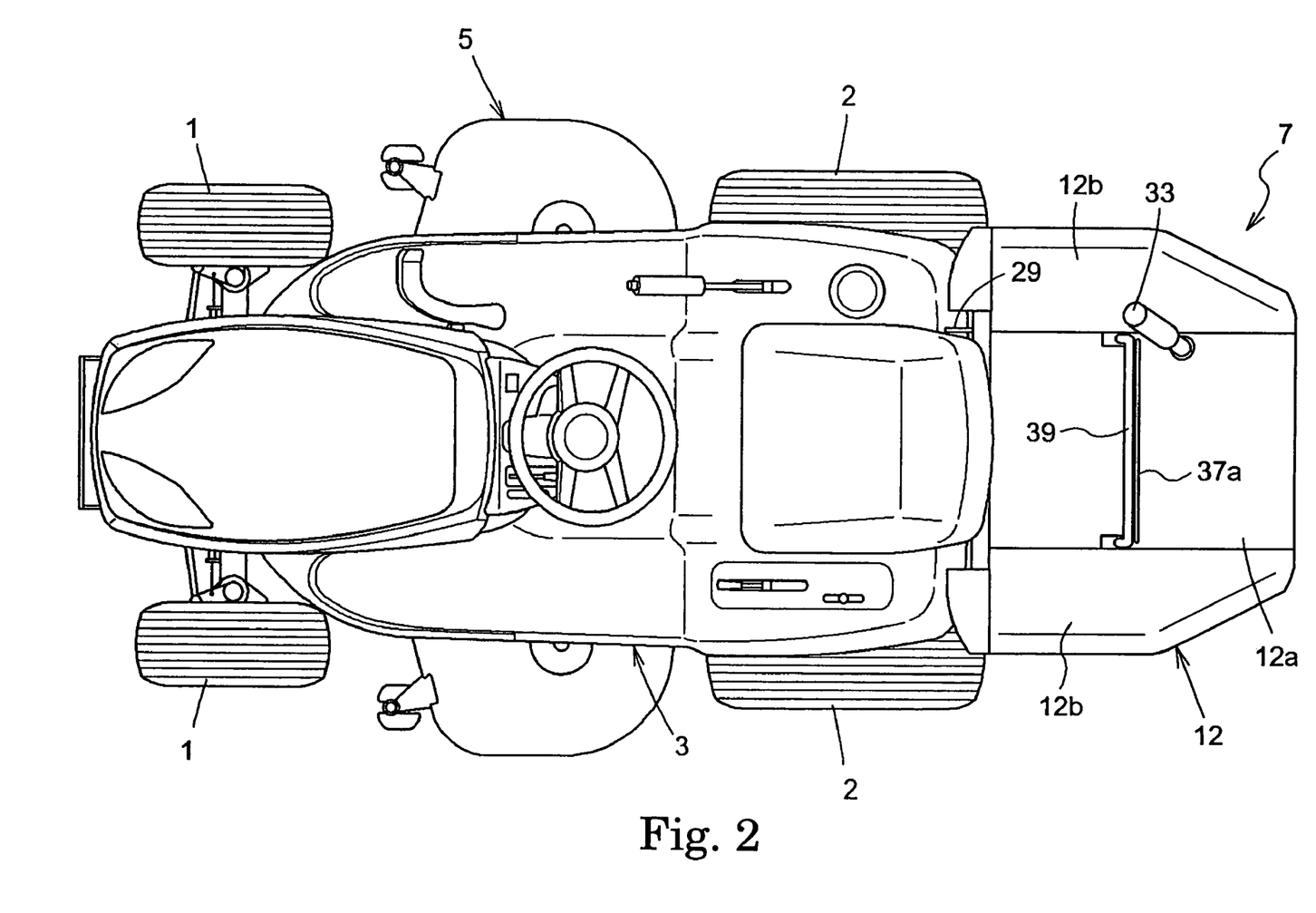
FIG. 2 is an overall plan view of the grass mower relating to the invention.
Figure 3A:
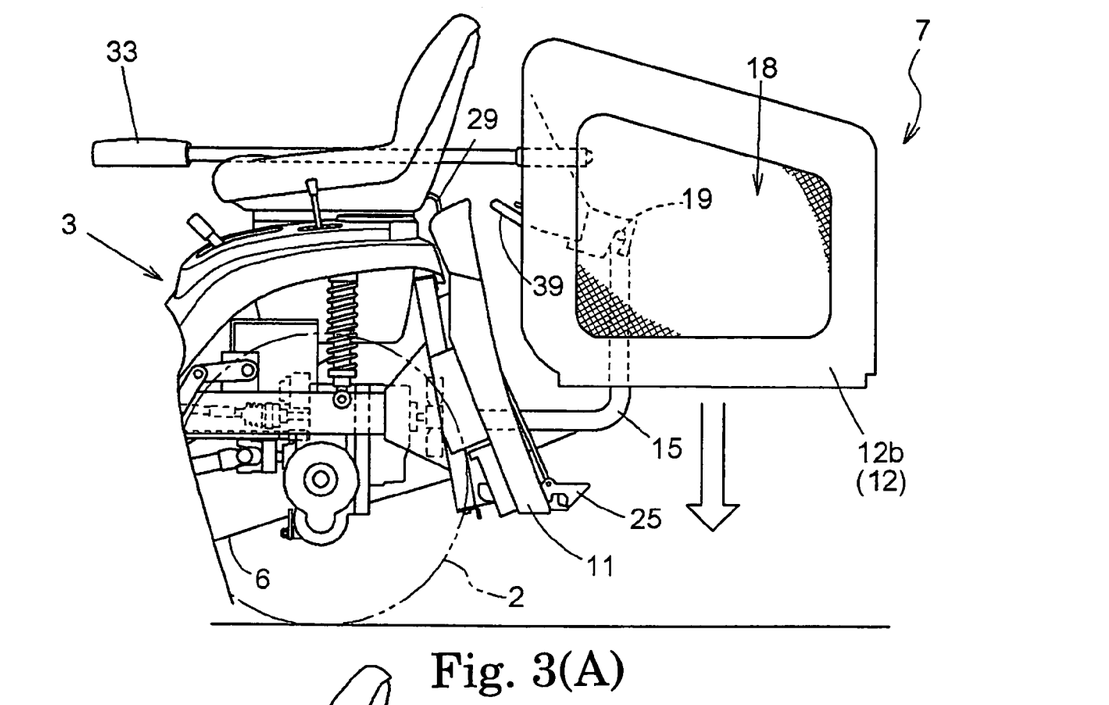
FIGS. 3(A) and 3(B) are side views showing a container in its opened position and a container its detached position respectively.
Figure 3B:
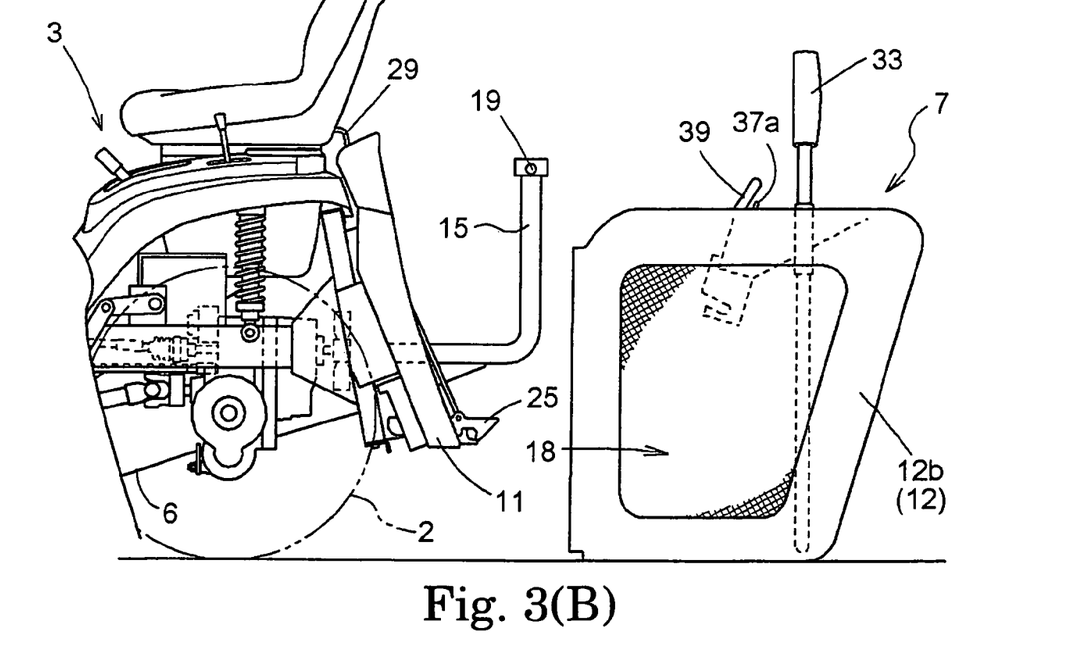

FIG. 1 is an overall side view of a grass mower having a grass collector relating to the present invention, and FIG. 2 is an overall plan view of the same. In the following discussion, the languages relating to directions such as "front", "front direction", or "rear" or "rear direction" are used relative to the grass mower. This grass mower is a four-wheel drive, ride-on type vehicle having a pair of steerable front wheels 1 and a pair of non-steerable rear wheels 2 with all the wheels being driven respectively by an engine.

At a lower portion of a vehicle body 3, there is suspended a triple-blade type mower unit 5 via a link mechanism 4 having a front link 4*a* and a rear link 4*b* so that the mower unit 5 can be lifted up/down relative to the vehicle body. Grass cuttings cut by the mower unit 5 are transported by a wind force trough a duct 6 disposed at a right-wise offset portion of the vehicle body to be collected by a grass collector 7 mounted at the rear of the vehicle body.

Figure 4:
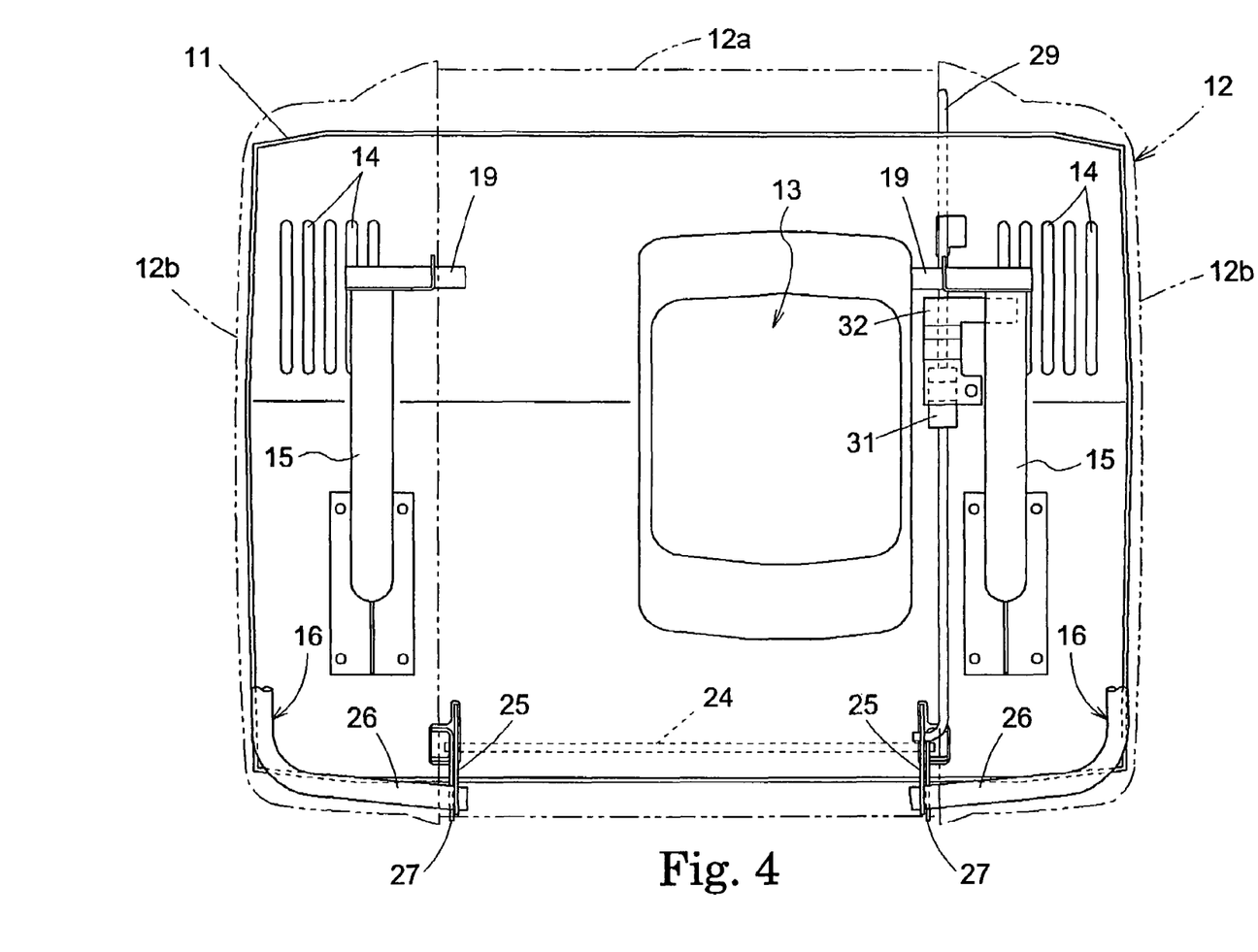
FIG. 4 is a rear view showing a support frame for the grass collector.

The grass collector 7 consists mainly of a vertical wall-like support frame 11 secured to the rear end of the vehicle body 3 and a grass container 12 pivotally supported and detachably mounted to the support frame 11 indirectly through a pair of container supporting arms 15. As shown in FIG. 4, a rear end of the duct 6 is connected to an inlet 13 formed at a rightward portion of the support frame 11.

Figure 7:
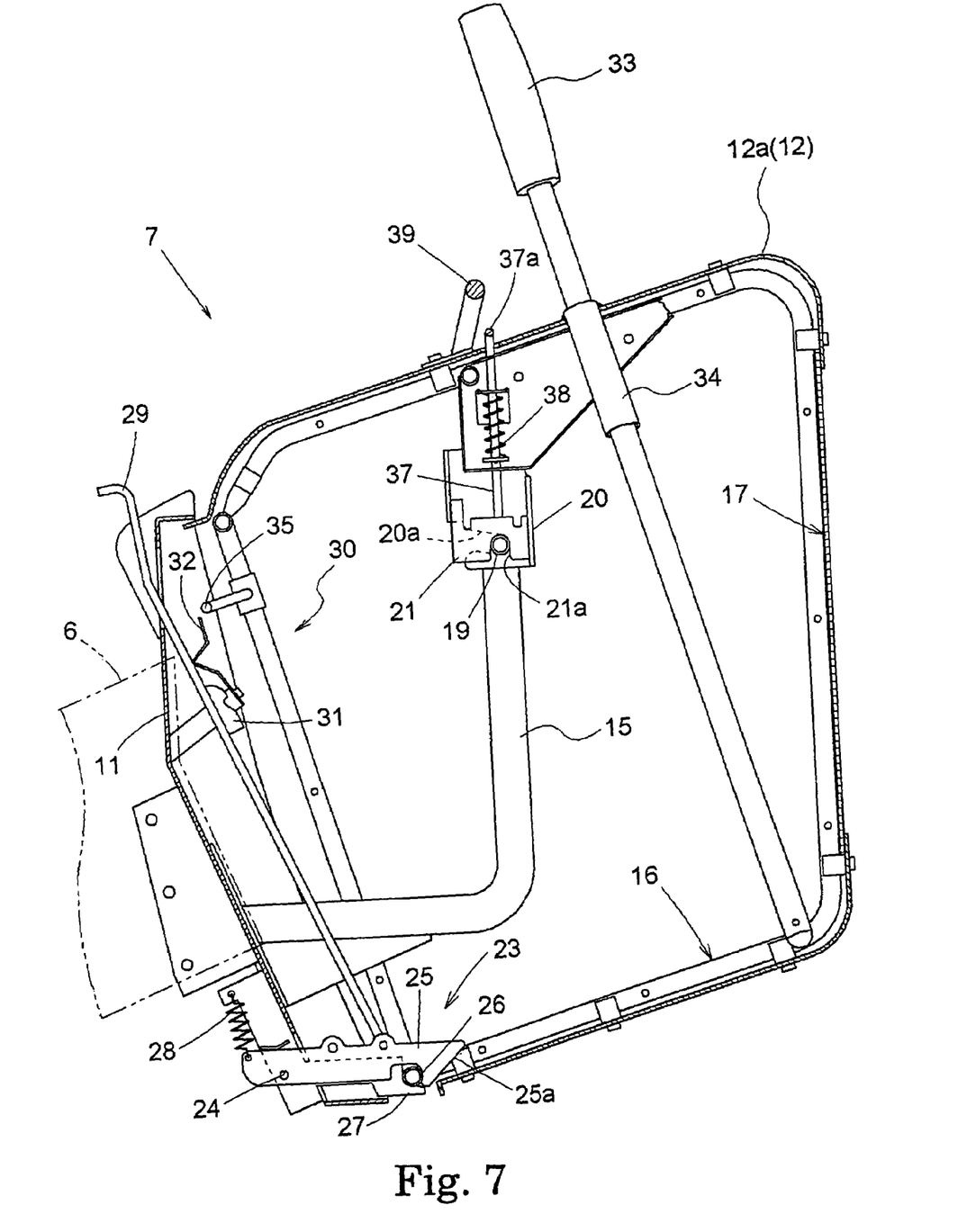
FIG. 7 is a side view in vertical section of the grass collector.
Figure 8:
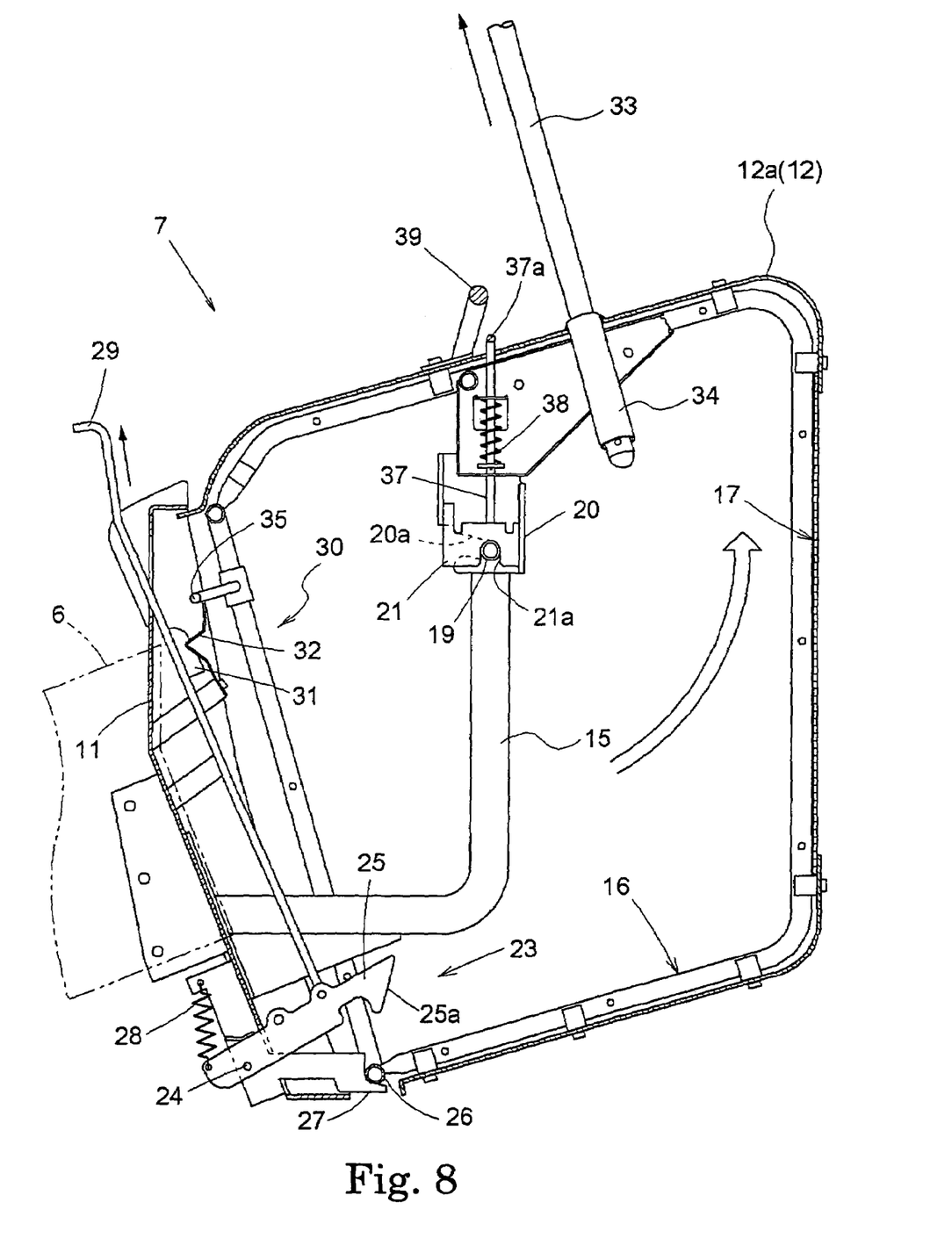
FIG. 8 is a side view in vertical section showing the grass collector under its pivot lock released condition.

On the right and left sides of the inlet 13, the support frame 11 includes a pair of slit-like vents 14 for discharging the grass transporting wind to the outside. Further, as shown in FIG. 7, ends of a pair of container supporting arms 15 for supporting the grass container 12 are affixed to the support frame 11 and the arms 15 extend rearwardly and then upwardly from this support frame 11.

Figure 6:
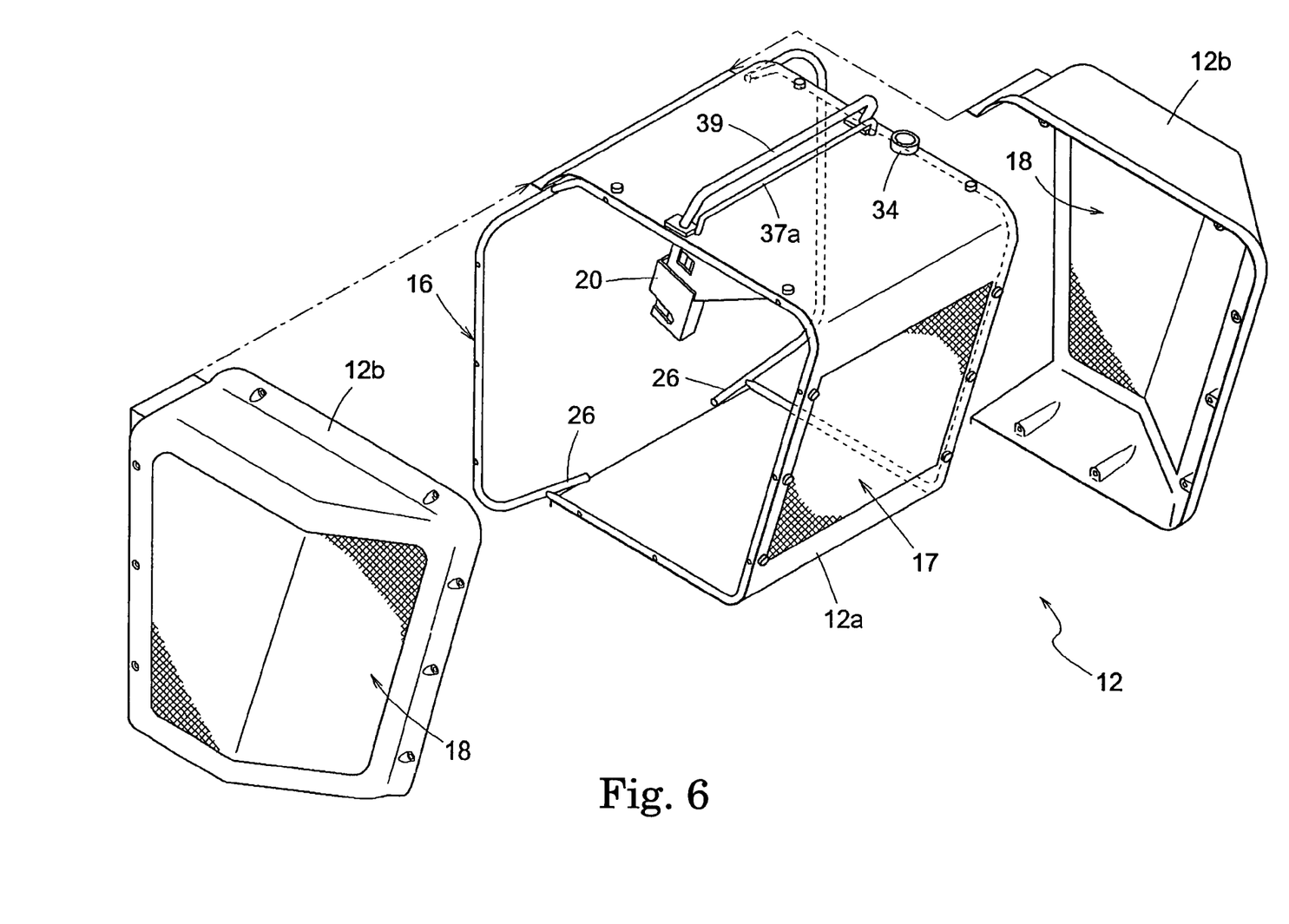
FIG. 6 is an exploded perspective view of the grass container.

As shown in FIG. 6, the grass container 12 includes a container body 12*a* having upper, rear and bottom faces and a pair of side covers 12*a* connected to the right and left sides of the container body 12*a*. More particularly, the container body 12*a* and the side covers 12*b* are bolt-connected respectively to an inner frame 16 comprised of an inter-connected assembly of pipe members, whereby the container as a whole is formed like an box with its front side open. Further, at a rear area of the container body 12*a*, there is formed a vent portion 17 comprised of a large number of parallel rows of small holes. Each side cover 12*b* also includes a vent portion 18 also comprised of a number of parallel rows of small holes. In operation, the grass transporting wind drawn into the container exits through these vent portions 17, 18 of the grass container 12 and the vents 14 of the support frame 14.

The container body 12*a* is to receive directly any transported objects possibly including a hard object such as a pebble, a tree shoot etc. discharged with significant momentum from the rear end of the duct 6. For this reason, this container body 12*a* is formed of sheet metal not to be damaged when being hit by such hard foreign object. On the other hand, the side covers 12*b* are less likely to be hit by the hard objects. Therefore, these side covers 12*b* are formed of resin which can be easily shaped. Incidentally, different container bodies 12*a* with different widths can be connected with the same side covers 12*b*. Therefore, different grass containers with different capacities can be provided at low costs.

The grass container 12 is adapted to be pivotally and detachably mounted and supported to the support frame 11 indirectly through the container supporting arms 15. This support structure will be described in detail next.

Figure 5:
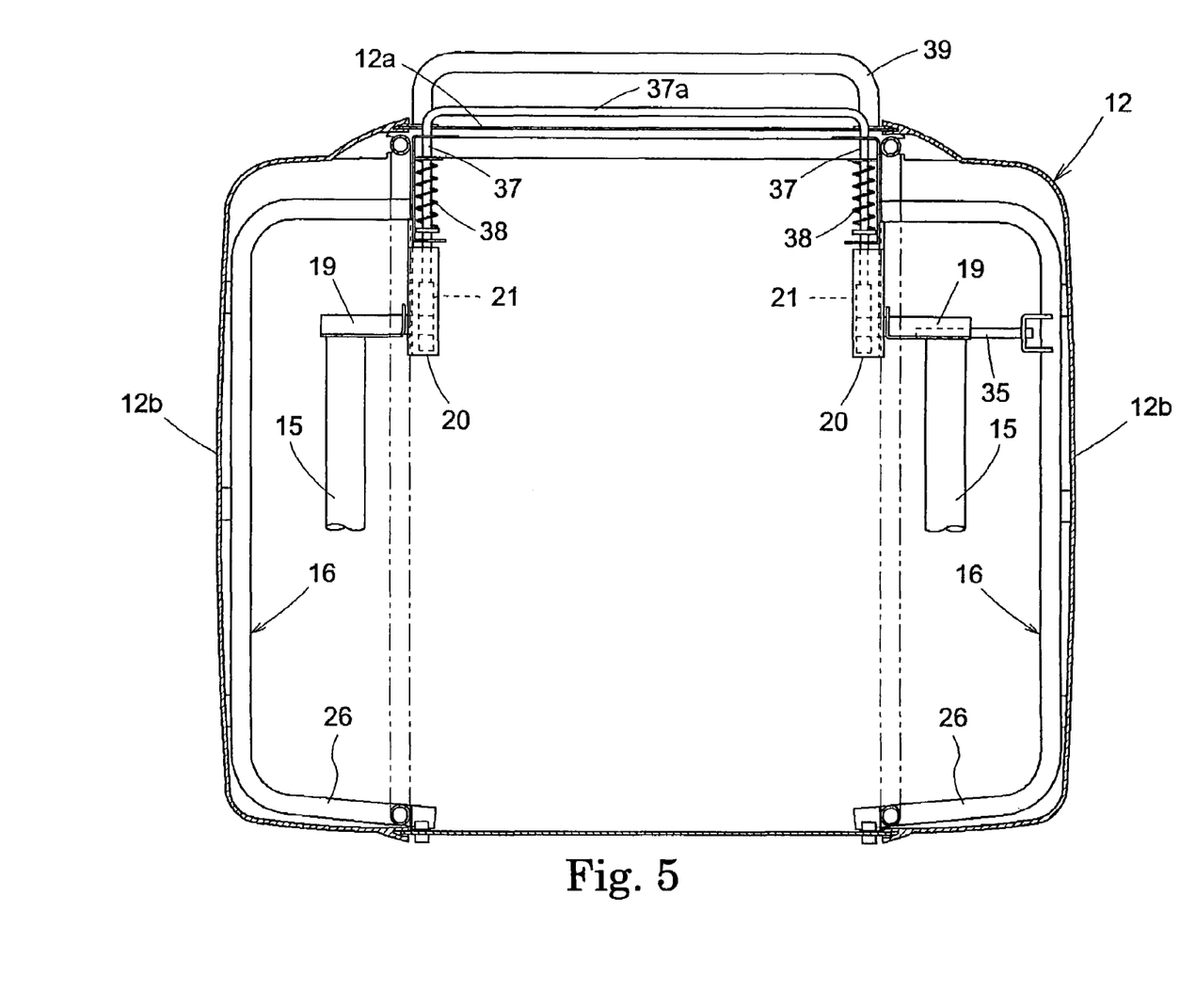
FIG. 5 is a rear view in section of a grass container.

As shown in FIG. 5 and FIG. 7, at respective leading ends of the right and left container supporting arms 15, there are affixed support shafts 19 each having a horizontal axis and acting as a connecting portion for supporting the container.

On the other hand, a pair of engaging members 20 engageable with the respective support shafts 19 are affixed to the right and left sides of the inner frame 16 of the grass container 12. Each engaging member 20 includes an engagement lock member 21 for preventing inadvertent disengagement of the engaging member 20 from the support shaft 19 associated therewith. Further, this engaging member 20 defines a forwardly open engaging recess 20*a*. Then, by removing the engaging recesses 20*a* from the support shafts 19 rearwardly, the grass container 12 can be detached. Also, each engagement lock member 21 defines a downwardly opening engaging recess 21*a*. Then, when the engagement lock member 21 is kept engaged with the support shaft 19, the engaging recess 20*a* of the engaging member 20 is closed, thus preventing rearward detachment of the engaging member 20 from the support shaft 19.

Figure 9:
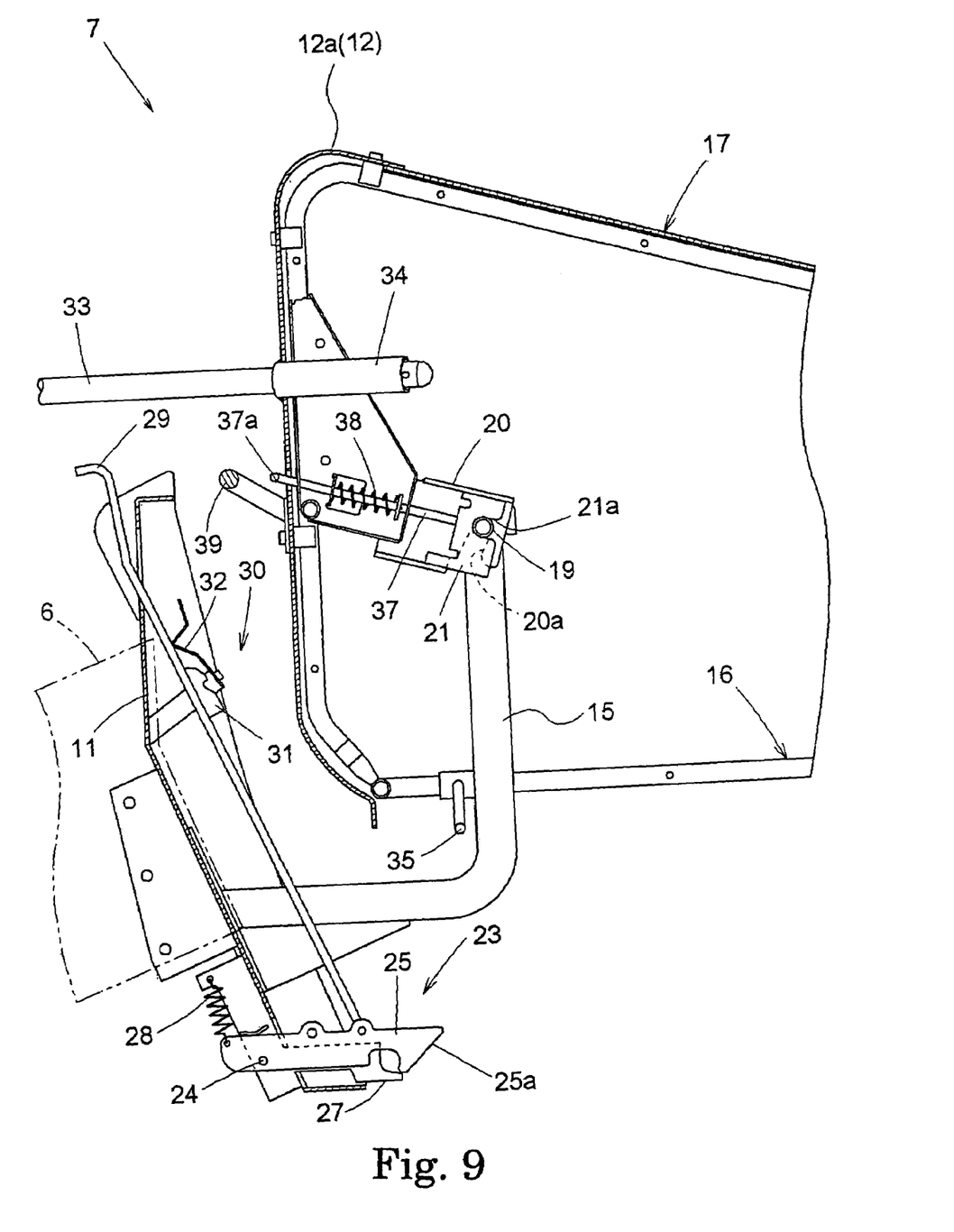
FIG. 9 is a side view in vertical section showing a condition when the grass container is pivotally opened.

As the grass container 12 is connected to the pivots of the container supporting arms 15 by using the engaging members 20 and the engagement lock members 21, the grass container 12 can be vertically pivoted about the pivot shafts 19. When the grass container 12 is pivoted downwardly, the container 12 assumes a grass collecting posture (see FIG. 7) where the front face of the container 12 is connected to the support frame 11 and communicated with the duct 6. When the grass container 12 is pivoted upwardly, the container 12 assumes a grass discharging posture (see FIG. 9) where the front face thereof is away from the support frame 12 and downwardly open.

At a lower portion of the support frame 11, there is provided a lock mechanism 23 for locking the grass container 12 in its grass collecting posture so that it is fixed against the support frame 11. This lock mechanism 23 has a pair of right and left hook-like lock members 25 which are vertically pivotally supported to the support frame 11 via horizontally oriented pivot shafts 24 and a pair of lock elements 26 provided at a lower end of the front portion of the inner frame 16 of the grass container 12. In operation, with the lock elements 26 placed and supported on receiving elements 27 provided at a lower portion of the support frame 11, the respective lock members 25 are engaged with the lock elements 26 from above, which locks the grass container 12 in the grass collecting posture against the support frame 11.

In the above-described operation, each lock member 25 is pivotally urged by a spring 28 downward, i.e. to its locking direction. Further, this lock member 25 is connected to a lower end of a control rod 29 which extends through and is vertically slidable supported to the support frame 11 and which acts as a "lock releasing or engagement releasing member". By pulling the control rod 29 upwardly against the spring 28, the lock member 25 is moved to its lock releasing position.

Figure 10:
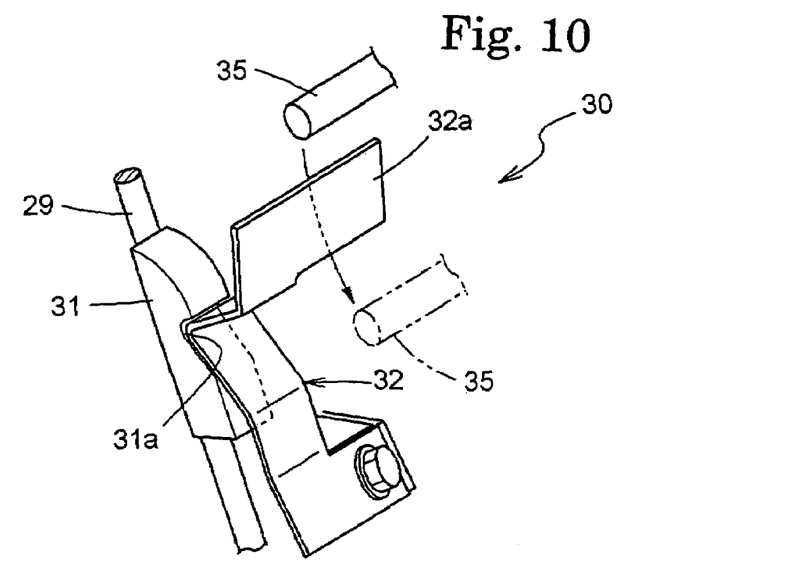
FIG. 10 is a perspective view of a lock release maintaining mechanism.
Figure 11A:
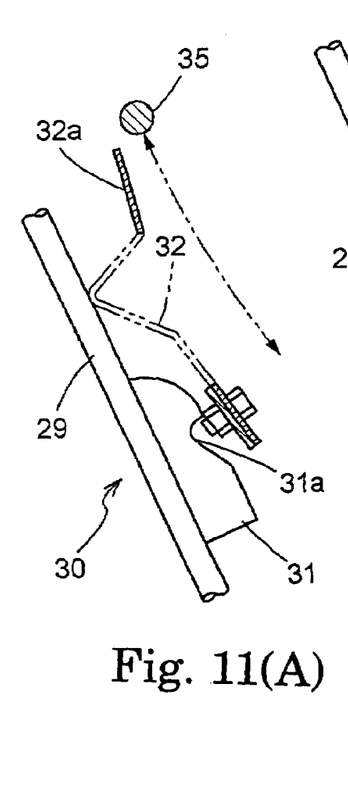
FIGS. 11(A), 11(B), 11(C) are side views illustrating an operation of the lock release maintaining mechanism.
Figure 11B:
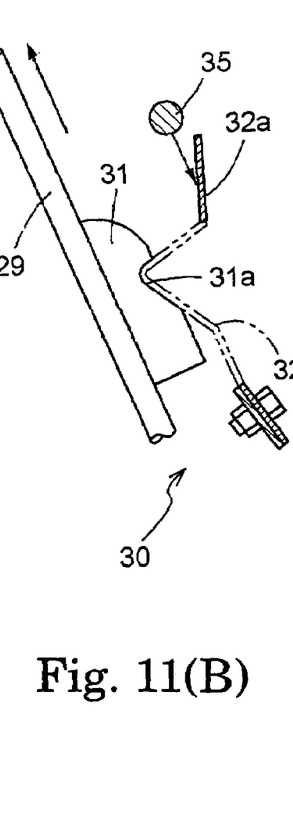
Figure 11C:
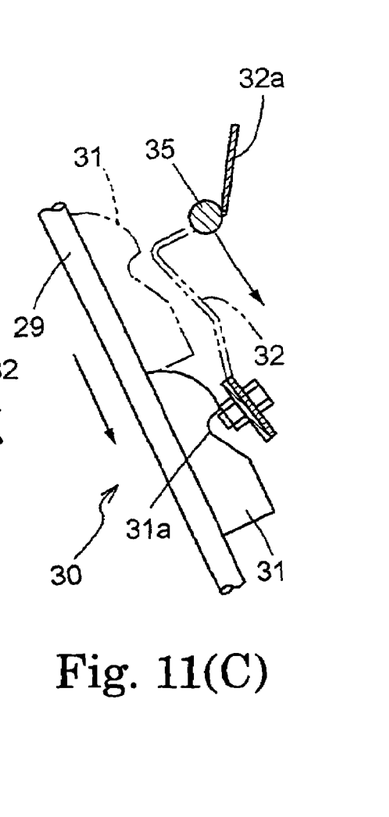

Moreover, at an upper portion of the support member 11, there is provided a lock release maintaining mechanism 30 for maintaining the control rod 29, operated to the lock releasing position, in this lock released condition against the urging force. As shown in FIGS. 10 and 11, this lock release maintaining mechanism 30 includes a retaining element 31 affixed to the control rod 29 and a maintaining member 32 formed of a plate spring and attached to the support frame 11 by a post. In operation, when the control rod 29 is pulled up to its lock releasing position, the maintaining member 32 elastically engages into an engaging recess 31*a* defined in the retaining element 31, thereby to prevent downward return movement of the control rod 29, so that the lock mechanism 23 is maintained under the lock released condition.

Therefore, once the operator has pulled up the control rod 29, the lock released condition is maintained even if the operator removes his/her hand from the rod 29. Then, by forwardly tilting a container pivot control handle 33 provided erect or as a projection on the top face of the grass container 12, the grass container 12 can be pivoted to its grass discharging posture. Incidentally, the handle 33 is vertically slidably inserted and supported to a vertically oriented boss portion 34 provided in the inner frame 16, so that normally the handle 33 is slid downward for its storage and when used for pivoting the grass container, the handle 33 is pulled upward to be usable as an elongate handle.

When the lock release maintaining mechanism 30 is activated and the grass container 12 is pivoted to its grass discharging posture, the lock release maintaining function of this mechanism 30 is automatically released to enable the lock mechanism 23 to be operable again. More particularly, with the control rod 29 pulled up and maintained in this position, if the grass container 12 is pivoted to the grass discharging direction, as shown in FIG. 11(B) and FIG. 11(C), a control element 35 provided in the inner fame 16 of the grass container 12 comes into abutment against a free end 32a formed in the maintaining member 32 of the lock release maintaining mechanism 30, thereby deforming this maintaining member 32 to its engagement releasing direction, so that the lock release maintaining mechanism 30 is released to allow a downward movement of the control rod 29, whereby the lock members 25 are pivoted to the locking conditions under the urging forces of the springs 28. When the grass container 12 is pivoted further toward its grass collecting posture, the lock elements 26 come into contact with downwardly inclined cam faces 25a formed at the respective leading ends of the lock members 25, so that these lock members 25 are pivotally pushed upward against the springs 28. Thereafter, when the grass container 12 reaches the grass collecting posture, the lock members 25 automatically engage the lock elements 26. Incidentally, as shown in FIG. 11(A), when the grass container 12 is pivoted from the grass discharging posture to the grass collecting posture, the control element 35 just passes the free end 32a of the maintaining member 32 without interfering therewith.

The control rod 29 and the handle 33 are respectively disposed on the right side of the grass collector 7. Therefore, the operator can effect the pull-up operation of the control rod 29 and the container pivoting operation using the handle 33 while this operator is standing on the right side of the grass collector 7.

The grass container 12 pivotally supported in the manner described above can be detached from the support frame 11 as described next. As shown in FIG. 5, he right and left engagement lock members 21 of the grass collector 12 are connected respectively with a lower end of an arch-shaped engagement releasing tool 37 inserted through the top face of the container to be vertically operable and these lock members 21 are constantly slidably urged downwards by a compression coil spring 38 fitted on the leg of the engagement releasing tool 37. Further, affixed on the top face of the grass container 12 is an arch-shaped handle 39 so that the operator can grip this handle 39 and a control portion of the engagement releasing tool 37 together or simultaneously.

Figure 12:
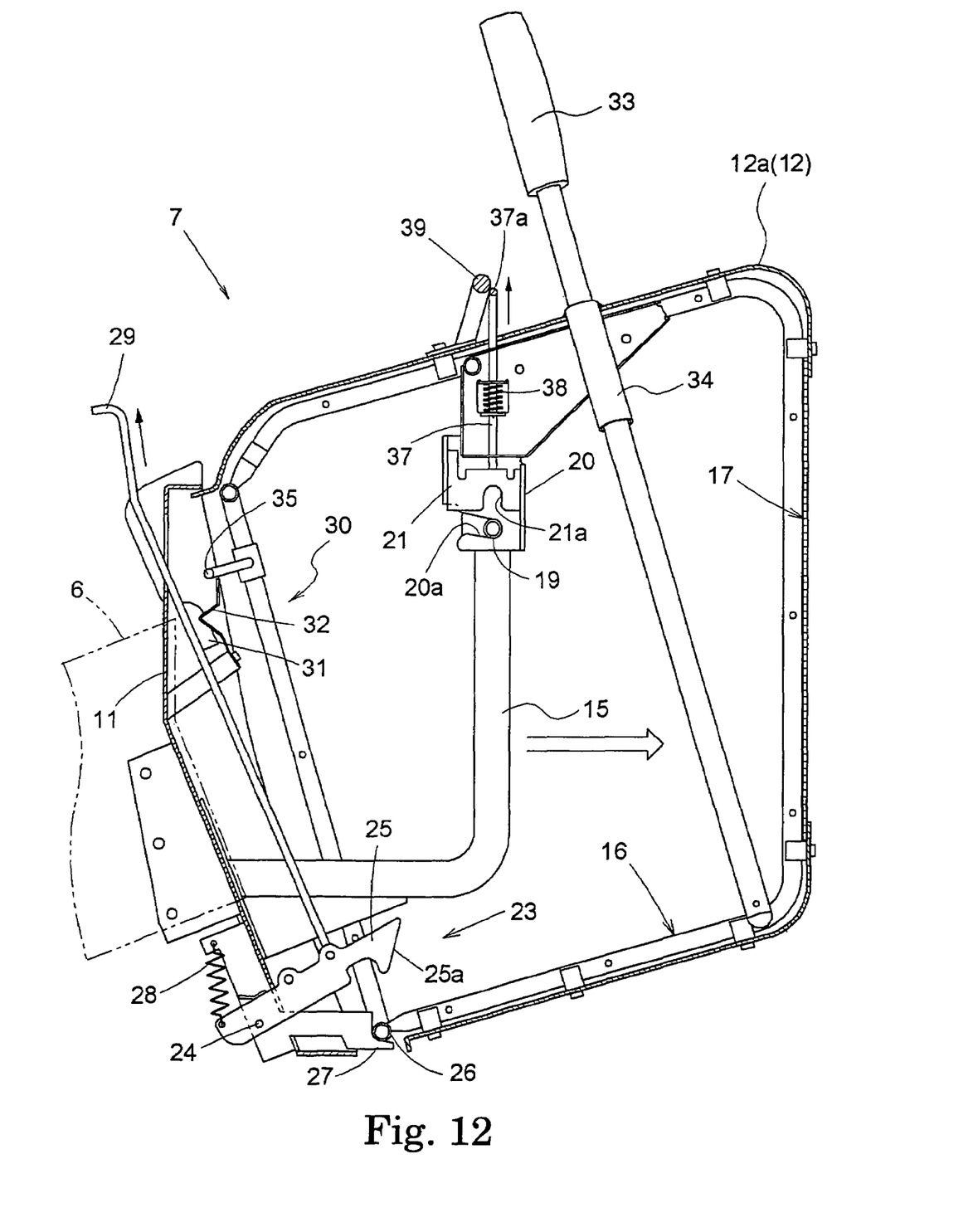
FIG. 12 is a side view in vertical section showing the grass collector under its lock released condition for detachment of the grass container.
Figure 13:
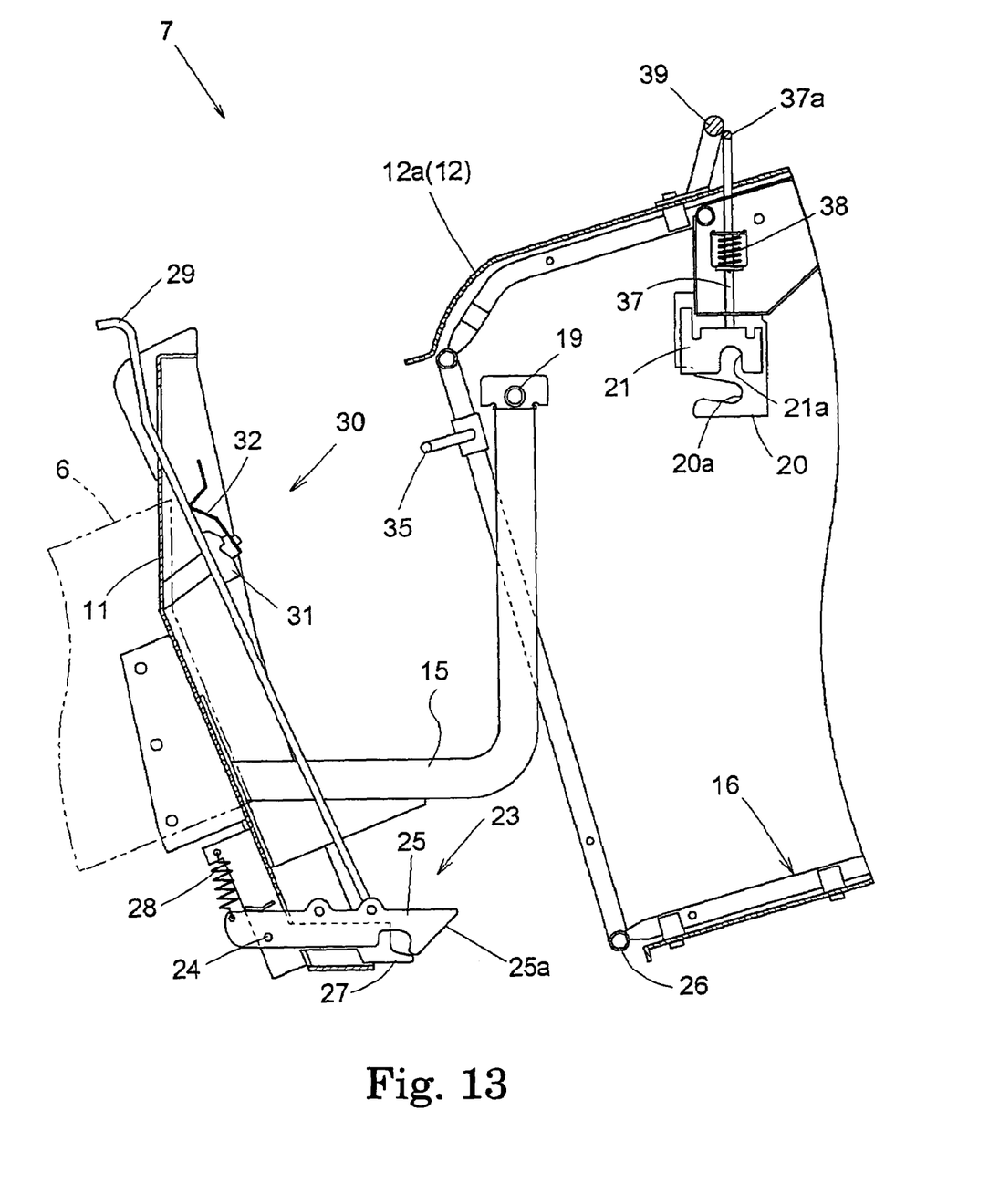
FIG. 13 is a side view in vertical section showing a detached condition of the grass container.
Figure 14:
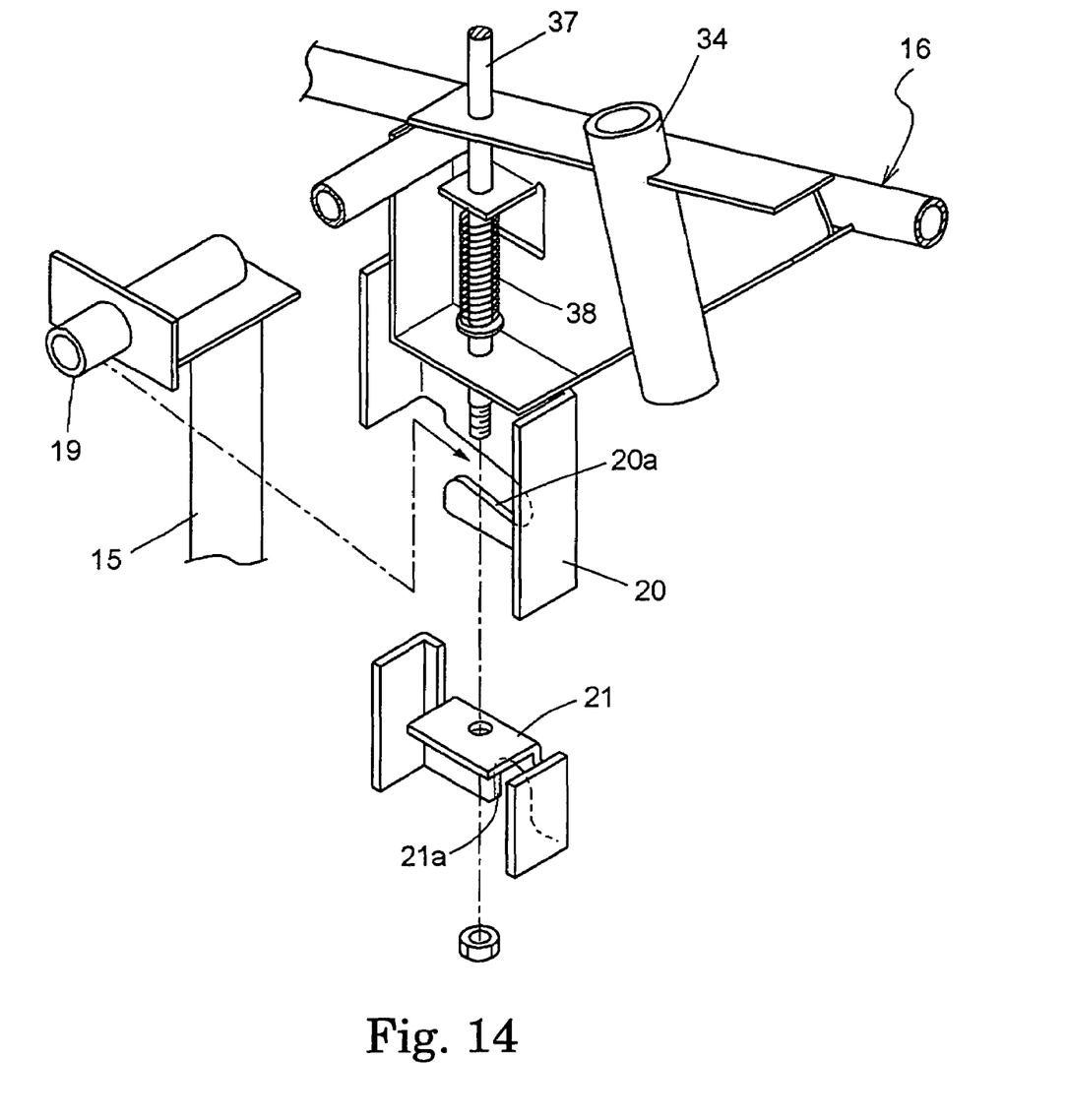
FIG. 14 is an exploded perspective view showing a pivot portion of the grass container.

With the grass container 12 in the grass collecting posture, hence, connected to the support frame 11 (see FIG. 7), when the operator grips the handle 39 projecting from the top face of the container together with the control portion 37a of the engagement releasing tool 37 and then pulls them up, as shown in FIG. 12, the engagement lock members 21 are moved upward to be detached from the respective support shafts 19, whereby the engaging recesses 20a of the engaging members 20 are opened toward the front side. Then, as the operator moves the grip 39 in the rear direction, the entire grass container 12 is pivoted rearward about the engaged portion of the lock mechanism 23, whereby the engaging members 20 are detached from the respective support shafts 19. The grass container 12 is thus detached from the pivots of the container supporting arms 15. Thereafter, as the operator moves the grass container 12 in the rear direction to disengage the lock elements 26 from the receiving elements 27, the grass container 12 is dismounted from the support frame 11. Incidentally, for mounting the dismounted grass container 12 to the support frame 11 again, this is possible by effecting the above-described detaching operation in reverse.

What is claimed is:

1. A grass collector for a grass mower adapted to move grass cuttings from a mower unit through a duct into a grass container disposed at a rear portion of a vehicle body, the grass collector comprising:

a support frame configured to be attached to the rear portion of the vehicle body of the grass mower;

a connecting portion supported by the support frame;

an engaging member provided to the grass container and engageable with the connecting portion wherein the grass container is detachably mounted to the support frame by the engagement of the engaging member with the connecting portion;

an engagement lock member provided in the grass container for preventing disengagement of the engaging member from the connecting portion; and an engagement releasing tool for releasing the engagement lock member, the releasing tool being disposed adjacent a handle provided on a top face of the grass container so that the releasing tool may be gripped simultaneously with the handle wherein the entire grass container is pivotally supported by said connecting portion, so that the container can selectively assume a grass discharging posture where a front face of the container is away from the support frame and open downwardly or a grass collecting posture where the front face of the container is connected to the support frame and communicated with the duct; and the grass collector further comprises a lock mechanism displaceable between a locking position where the mechanism locks the container to the grass collecting posture and a lock releasing position where the mechanism does not lock the container to the grass collecting posture.

2. The grass collector according to claim 1, wherein said connecting portion comprises a horizontally extending support shaft; and said engaging member is configured to engage said connecting portion from the rear side of said connecting portion.

3. The grass collector according to claim 1, further comprising a lock release maintaining means for maintaining said lock mechanism to said lock releasing position.

4. The grass collector according to claim 3, further comprising: means responsive to a movement of the grass container to the grass discharging posture for causing said lock release maintaining mechanism to return said lock mechanism to said locking position.

5. The grass collector according to claim 1, wherein
the lock mechanism comprises a hook-like member displaceable between a locking position where the hook-like member engages a lower portion of the grass container and locks the container to the grass collecting posture and a lock releasing position where the hook-like member does not lock the container to the grass collecting posture.

6. The grass collector according to claim 1, further comprising a retaining member operatively connected with said lock mechanism and a maintaining member affixed to said support frame and engageable with said retaining member for retaining said lock mechanism to said lock releasing position.

7. The grass collector according to claim 6, further comprising a control element responsive to a movement of the grass container to the grass discharging posture for releasing the engagement between said retaining member and said maintaining member.

8. The grass collector according to claim 1, wherein the lock mechanism engages a lower portion of the grass container when the lock mechanism is in the locking position.

9. A grass mower comprising:
a vehicle body supported on a plurality of wheels;
a mower unit suspended from the vehicle body;
a duct for guiding grass cuttings from the mower to a rear of the vehicle body; and
a grass collector disposed at a rear portion of a vehicle body for collecting grass cuttings guided by the duct;
wherein the grass collector includes:
a support frame configured to be attached to the rear portion of the vehicle body of the grass mower;
a connecting portion supported by the support frame;
an engaging member provided to the grass container and engageable with the connecting portion wherein the grass container is detachably mounted to the support frame by the engagement of the engaging member with the connecting portion;
an engagement lock member provided in the grass container for preventing disengagement of the engaging member from the connecting portion; and
an engagement releasing tool for releasing the engagement lock member, the releasing tool being disposed adjacent a handle provided on a top face of the grass container so that the releasing tool may be gripped simultaneously with the handle wherein the entire grass container is pivotally supported by said connecting portion, so that the container can selectively assume a grass discharging posture where a front face of the container is away from the support frame and open downwardly or a grass collecting posture where the front face of the container is connected to the support frame and communicated with the duct; and
the grass collector further comprises a lock mechanism displaceable between a locking position where the mechanism locks the container to the grass collecting posture and a lock releasing position where the mechanism does not lock the container to the grass collecting posture.

10. The grass mower according to claim 9, wherein said connecting portion comprises a horizontally extending support shaft; and
said engaging member is configured to engage said connecting portion from the rear side of said connecting portion.

11. The grass mower according to claim 9, further comprising a lock release maintaining means for maintaining said lock mechanism to said lock releasing position.

12. The grass mower according to claim 11, further comprising: means responsive to a movement of the front face of the grass container to the grass discharging posture for causing said lock release maintaining mechanism to return said lock mechanism to said locking position.

13. The grass mower according to claim 9, wherein
the lock mechanism comprises a hook-like member displaceable between a locking position where the hook-like member engages a lower portion of the grass container and locks the container to the grass collecting posture and a lock releasing position where the hook-like member does not lock the container to the grass collecting posture.

14. The grass mower according to claim 9, further comprising a retaining member operably connected with said lock mechanism and a maintaining member affixed to said support frame and engageable with said retaining member for retaining said lock mechanism to said lock releasing position.

15. The grass mower according to claim 14, further comprising a control element responsive to a movement of the front face of the grass container to the grass discharging posture for releasing the engagement between said retaining member and said maintaining member.

16. The grass mower according to claim 9, wherein the lock mechanism engages a lower portion of the grass container when the lock mechanism is in the locking position.

* * * * *